Aug. 31, 1948.    H. G. LYKKEN ET AL    2,448,038
DISINTEGRATOR AND VORTICAL CLASSIFIER FOR SOLIDS
Filed Aug. 1, 1942                       2 Sheets-Sheet 1

INVENTORS
Henry G. Lykken
William H. Lykken
BY
ATTORNEY

Aug. 31, 1948.   H. G. LYKKEN ET AL   2,448,038
DISINTEGRATOR AND VORTICAL CLASSIFIER FOR SOLIDS
Filed Aug. 1, 1942   2 Sheets-Sheet 2

INVENTORS
Henry G. Lykken
William H. Lykken
BY
ATTORNEY

Patented Aug. 31, 1948

2,448,038

UNITED STATES PATENT OFFICE 2,448,038

DISINTEGRATOR AND VORTICAL CLASSIFIER FOR SOLIDS

Henry G. Lykken and William H. Lykken, Minneapolis, Minn.

Application August 1, 1942, Serial No. 453,287

11 Claims. (Cl. 241—38)

1

The present invention relates to a new and improved apparatus for handling material to be classified or segregated and to an improved process for the manufacture of polishing rouge.

That is to say, this apparatus has wider fields of application in connection with friable materials generally than the process of producing polishing rouge. However, the invention will be described in connection with such process and material by way of exemplifying the principles of the apparatus.

Polishing rouge such as is used for polishing glass is an amorphous powder consisting of ferric oxide usually prepared by calcining ferrous sulphate. The ferric oxide is frequently produced from iron and steel borings which is wet ground to reduce the granular structure, then hydraulically classified for sizing and removal of foreign material, such as silica, magnetite, etc., and dried ready for use. It is desirable that the polishing rouge have a particle size of two or three microns, and most of the rouge, under the treatment just described, will be reduced to the desired size, but some oversize granular oxide is carried over in the classification as are particles of foreign material. Such oversize particles and foreign material produce scratches in the glass being polished and thereby ruin the work. It is difficult according to prior processes to produce polishing rouge which is free from contamination.

The apparatus hereinafter described can be used to purify the polishing rouge produced according to the above process by elimination of the oversize particles and by elimination of the foreign substances, just as these same beneficial results can be obtained with other pulverized materials, such as talc, for example.

However, by substitution of this apparatus for the step of the wet grinding referred to in the rouge process outlined above, that step, as well as the water flotation for classification and the subsequent drying of the material can be eliminated. At the same time the polishing rouge is produced without oversized particles and without foreign materials of a kind which will produce scratches on the surface being polished.

One mill grinding lenses reports practically complete elimination of their losses due to scratches in the polishing operation, which losses had previously amounted to fifty percent of their output, since using polishing rouge subjected to classification in the apparatus shown and described herein.

The described apparatus is useable to classify pulverized material to a selected particle size

2 and collect the desired material. It also is useable to segregate desired material from foreign substances while collecting the desired material.

The described apparatus also can be used to reduce some friable materials such as iron oxide that is not too hard, precipitated titanium oxide, lithopone, etc., and to this extent the original material can be prepared, classified and collected without first giving it to some other grinding process.

As a collector of pulverized materials, the apparatus has the advantage that the finer the desired particle size is, even to one micron particles, the better the collector functions, thus very substantially reducing losses of material encountered with prior methods of collection of such materials.

Other and further objects and advantages of our invention will be apparent from this specification taken in conjunction with the accompanying drawings, wherein—

Figure 1:
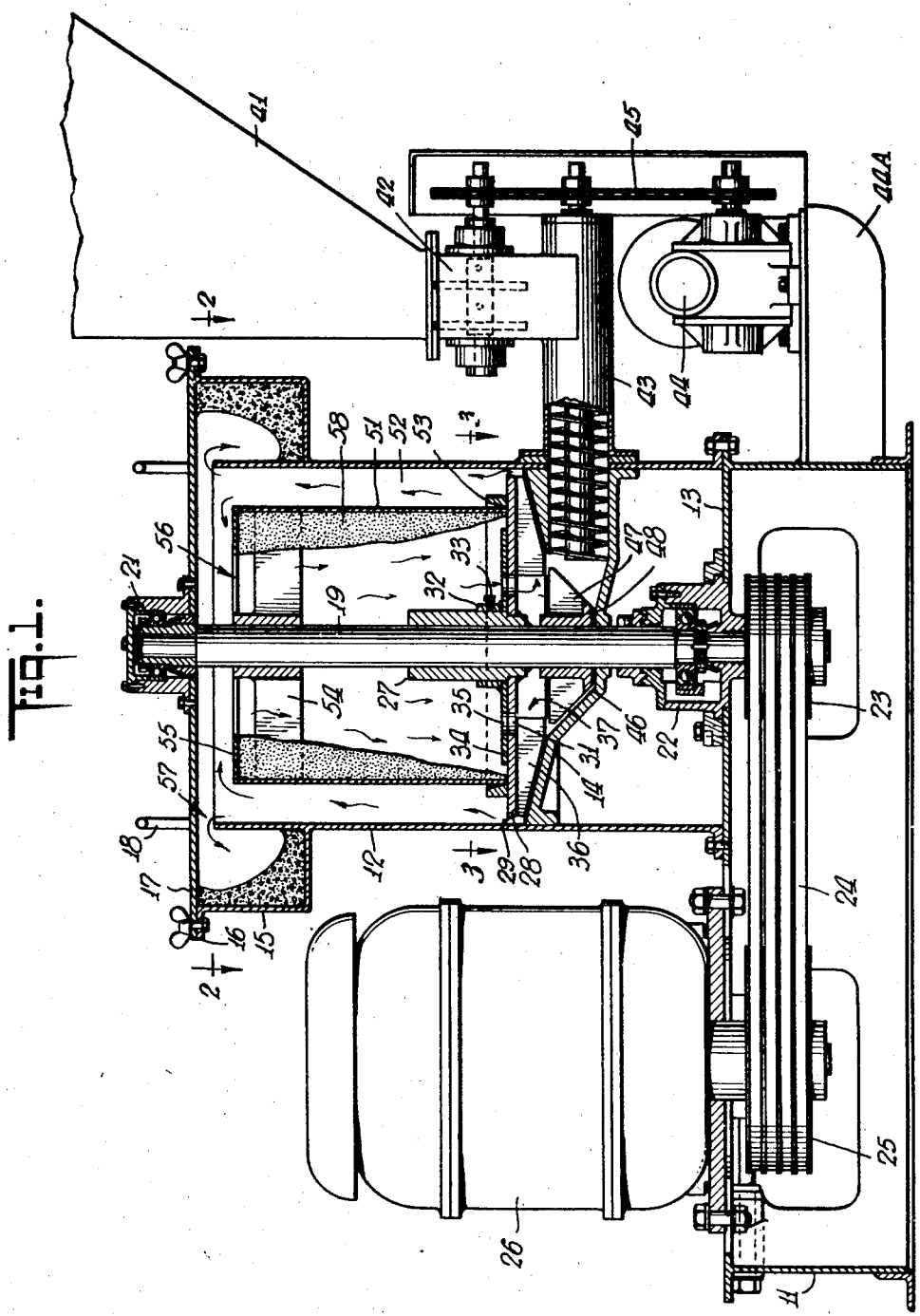
Figure 1 is a vertical longitudinal section through one apparatus constructed according to this invention, parts being broken away to facilitate the illustration.
Figure 2:
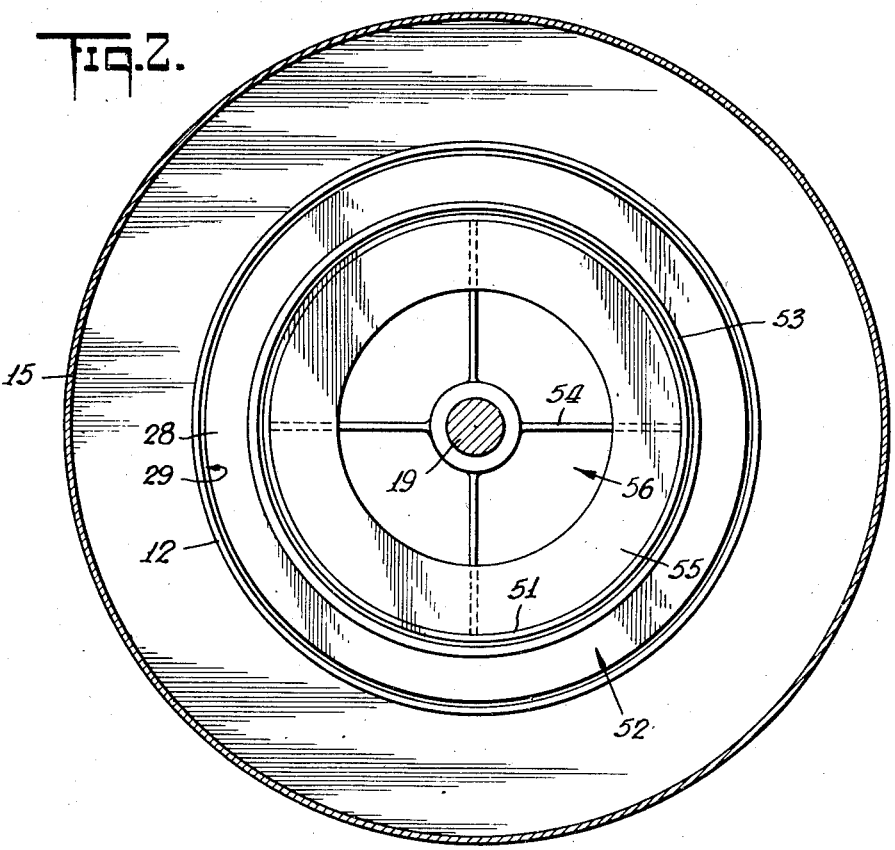
Fig. 2 is a horizontal section on the line 2—2 of Fig. 1, in enlargement, the connection of the feeding apparatus and the motor drive being omitted.

Referring to the drawings, the apparatus is mounted on a hollow base 11 and comprises a cylindrical casing 12 closed at its bottom by the top 13 of the base 11. In the casing 12 and spaced above the base is a bottom plate 14 which forms the bottom of the apparatus. Mounted on the outside of the casing 12 around the top thereof is an annular trough 15 the side wall of which extends above the top of the casing 12 and terminates in an annular flange 16. Like the casing 12 the trough 15 is open at its top and these open tops are closed by a cover 17 which is bolted to the flange 16 as indicated in Fig. 1. The cover has a pair of handles 18 thereon.

A central shaft 19 is mounted for rotation in bearings 21 and 22 respectively carried by the cover 17 and the base plate 13. The end of the shaft extends into the hollow base 11 and there is provided with a set of pulleys 23 receiving belts 24 which cooperate with pulleys 25 on the shaft of the driving motor 26. This is a usual V-belt type of drive and selective speeds are obtained through changing pulley sizes, as well as by varying the speed of the motor 26 through any suitable type of motor control, not shown.

Figure 3:
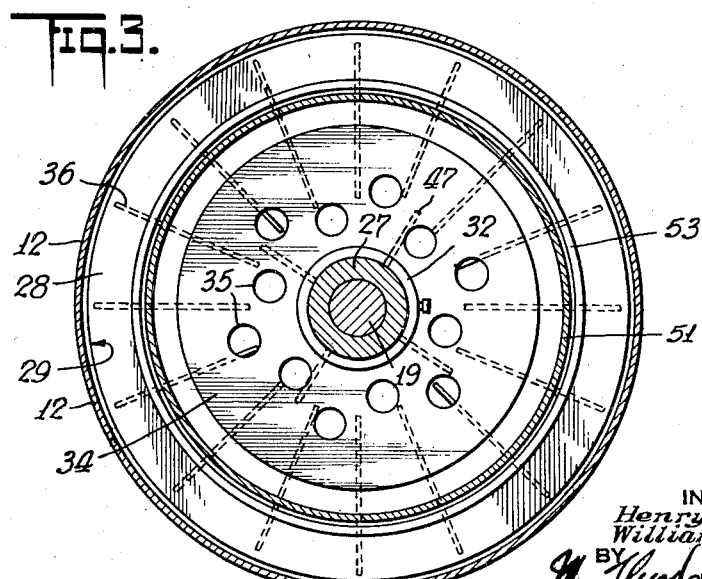
Fig. 3 is a horizontal section on the line 3—3 of Fig. 1, the connection of the feed apparatus and the motor drive also being eliminated.

The shaft 19 has secured thereto, as by welding, a sleeve 27 to which is fastened a flat disc 28. This disc is spaced above the bottom plate 14 and extends nearly to the inner surface of the casing 12, leaving a narrow annular throat 29 (Figs. 1 and 3). The outer edge of the disc may be tapered inwardly and downwardly, as shown. As also seen in Figs. 1 and 3, the disc 28 has a plurality of holes 31 therein distributed about the sleeve 27 and near thereto, these being air inlet openings. A collar 32 surrounds the sleeve 27, being free to turn thereon except when held in place by a set screw 33. The collar carries a disc 34 which rests upon the disc 28 and is similarly provided with holes 35 of the same size as holes 31. The holes 31 and 35 are arranged to register with each other so that by shifting the position of the disc 34 relative to the disc 31 the effective area of the air inlet openings through the discs is controlled. This is the adjustment for the air control, the purpose of which will be explained.

The underside of the disc 28 has attached thereto a plurality of radial blades 36 which extend from the perimeter of the disc inwardly part way to the shaft 19 leaving a central open area or eye 37. The number of these blades is sufficient to maintain an even distribution of material moving through the throat 29 into the classifier chamber, as will be described. In the illustrated example, there are sixteen blades 36 on a disc 28 fitting in a casing 12 that is eighteen inches in diameter. It will be noted that the lower edges of the blades 36 are tapered outwardly and upwardly from the eye 37, and that the upper surface of the bottom plate 14 is dished to coincide therewith so that there will be a close clearance therebetween and a narrowing of the material feed passage as it approaches the throat 29.

The material to be acted upon is fed beneath the disc 28 from a hopper 41 through a preliminary breaker 42, if desired, to a feed screw 43. The preliminary breaker and the feed screw are driven from a motor 44, mounted on a sub-base 44A, through suitable sprocket and chain speed reducing connections 45. It is contemplated that different sizes of sprockets may be used to vary the speed of the feed screw and breaker. The feed screw 43 communicates with a central depression 46 in the bottom plate 14, this depression being below the eye 37 of fan 36. At this point a spreader 47, consisting of four or more radial blades, is mounted on a hub 48 on the shaft 19. The material is picked up by the spreader 47 and passes therefrom into the eye 37 from whence it passes through the fan blades 36 into and through the throat 29. By these arrangements an even circumferential flow of material is maintained through the throat 29 at all times.

The chamber above the rotor disc 28 has an open ended cylinder 51 therein which is concentric with the casing 12 leaving an annular space 52 into which the material is fed from the circumferential throat 29. The cylinder 51 does not extend to the top of the casing 12 and it preferably has a smooth exterior surface facing a smooth interior surface of the casing 12. The cylinder rests upon the rotor disc 28 and is positioned thereon by means of the tapered ring 53. It is desirable that there be a friction fit between the cylinder and ring so that the cylinder 51 rotates with the disc 28. At its upper end the cylinder is fastened to a spider 54 the hub of which is slidable on the shaft 19. The upper end of the cylinder 51 is partially closed by the ring shaped plate 55 mounted thereon and providing a central opening 56 into the interior of the cylinder. It will be noted that the air inlet openings 31 communicate with the interior of the cylinder.

In the operation of the device per se, it will be evident that in the case of materials which are not sufficiently reduced in particle size a certain amount of pulverization can be caused to take place in the passage of the material through the blades of the rotating spreader 47 and the blades 36 on the rotor disc 28. This will be controlled according to what are the desired functionings of the apparatus by adjustment of the amounts of air and material fed. The action is in the nature of that occurring in a beater type of pulverizer.

However, if the apparatus is being fed material which is already sufficiently pulverized, the spreader 47 and the blades 36 will serve merely to mix the material with the air passing through the openings 31 from the interior of the cylinder 51, and to evenly distribute the mixture about the underside of the rotor disc 28.

In either case, air and material are projected into the bottom of the annular space 52 and has at that time a whirling movement with the material suspended in the air. The rotating smooth walled cylinder 51 acts as a rotor to set up and to maintain a vortical movement of the air and material in the annular space 52 as the air suspended material rises in that space. This is a high speed vortex since the rotor shaft 19 has a speed of approximately 2600 revolutions per minute. The result of that action is to cause the heavier and larger particles of material to move to the outer portion of the annular space 52 adjacent the casing wall 12. While the layer of material on the wall will have its movement in the vortex appreciably slowed down by frictional engagement therewith, such slowing will not be sufficient to allow the material to fall to the bottom of the chamber. Instead, the coarser and heavier material will continue to progress upwardly toward the top of the casing 12 to the mouth 57 formed between the top of the casing wall 12 and the cover 17. This mouth opens into the trough 15 where this coarser and heavier material is collected.

This same vortex action causes the lighter particles to move toward and to the surface of the rotating cylinder 51 where the vortex has its highest speed. It will be apparent that this segregation of the finer and lighter from the coarser and heavier particles is progressively and continually taking place in the vortex as the air suspended material spirals upwardly through the annular space 52. The finer particles are of the proper size which it is desired to collect and the air carrying these particles passes over the top of the cylinder 51, across the ring shaped plate 55, and enters the interior of the cylinder through the axial opening 56.

The air then passes down through the cylinder and the air openings 31 but as it does so, it is subjected to the high speed vortical movement produced by the inner surface of the cylinder 51 and the centrifugal force of the vortex causes the particles in this air to be thrown outwardly against the inner surface of the cylinder thus cleaning the air. It is the cleaned air which passes through the registering openings 35 and 31 in the discs 34 and 28 respectively, and into the fan 36 where it picks up other material being fed into the machine for segregation and classification.

It has been stated that the material on the inside of the cylinder 51 is the material which it is desired to collect. In the smaller micron sizes, and at times because of the nature of the material itself, the particles will adhere to the inner surface of the cylinder 51 and will build up or collect there, as indicated at 58. This action goes on while the oversize particles and the foreign material, which has a higher specific gravity than the rouge or other material being collected, is accumulating in the trough 15. Of course, considerable of the rouge or desired material will also find its way into the trough 15 along with the undesired substances.

When it is desired to empty the apparatus the cover 17 is removed, carrying with it the upper bearing 21 for the shaft 19. The cylinder 51 is then lifted off the shaft 19 and the disc 28 and as soon as the cylinder is clear of the machine the material collected on the inside thereof is removed by merely tapping the side of the cylinder, causing the material to fall into any suitable container. That material is then ready for use, and it will be found to have a particle size of 1, 2, 3, or more, microns depending upon the adjustments of the apparatus, as will be explained.

The material in the trough 15 is transferred to the hopper 41 and again fed through the re-assembled machine so as to recover the rouge material that is mingled with the foreign material. This operation is repeated until the trough 15 contains a high concentrate of foreign material which may then be discarded. Re-assembling the machine consists in returning the cylinder 51 to its seat upon the rotor disc 28 and ring 53, after which the cover 17 with the bearing 21 are re-mounted as shown.

The rotating cylinder 51 sets up a vortex in the casing 12 and at the same time partitions or vertically divides the vortex into two parts. The disc 28 closes the vortex chamber at the bottom except for the annular throat 29 and the air openings 31. Between the throat and openings are the fan blades 36, so that the air rises in the outer portion of the vortex (outside the cylinder) and descends on the interior of the vortex (inside the cylinder). This is a closed circuit within the apparatus so that any stray particles which are not collected on the inside of the cylinder 51 are necessarily re-circulated with the air in the machine and are not lost. As the air picks up the material below the disc 28 the air and material are forced through the narrow throat 29, expanding into the vortex that is outside the cylinder 51, and then there is a further expansion inside the cylinder.

A smooth walled vortex producing element and zone are preferred because the vortex is not then subjected to any undulatory or eddying disturbances which might interfere with the effectiveness of the segregation, etc., taking place.

The particle size of the collected material is controlled in one or more of several ways: (1) By varying the motor speed. (2) By controlling the rotor speed through changing the relationship of the pulleys 23 and 25. Reducing the velocity by either of those methods reduces the thoroughness of the removal of coarse particles. (3) By varying the effective area of the openings 31 admitting air to the fan 36, which, as explained, is done by shifting the position of the disc 34 to bring the openings 35 more or less into full registry with the openings 31. By reducing the effective area of these openings a smaller amount of air is caused to circulate through the cylinder 51, the circulation through the vortex zone 52 is slower and the material carried over into the collection cylinder 51 will be finer in particle size. (4) By varying the radial depth of the annular space 52. Insofar as our present experience goes, we believe that this annular space may be from one to three inches in radial depth. The narrower the space, the coarser will be the material entering the cylinder 51 and collected on the interior thereof. Of course, it is true, that the specific gravity or the flakiness of one material may require a two inch annular space for two micron material to be collected, while another material may require a different spacing for the same particle size to be collected. For rouge material, we have found that an annular space two inches in depth will satisfactorily classify out particles two microns in size with, of course, the accompanying fines, and will deposit the silica and other contaminating substances in the trough 15.

The apparatus may, if desired, be lined with rubber to reduce abrasion and wear and to increase the centrifugal action somewhat.

In the use of this apparatus as part of the process of manufacturing polishing rouge, the calcined ferrous sulphate, or ferric oxide, is placed directly in the hopper 41, is fed through the spreader 47 and the fan blades 36, and subjected to the centrifugal action produced by the rotating cylinder 51, the undesired material passing into the trough 15 and the desired rouge material being collected on the inside of the cylinder as above described. Some disintegrating action is generally caused to take place in the spreader 47 and the fan blades 36 so that according to this process, the uncontaminated rouge material is obtained directly from the ferric oxide by a process involving no wetting of the same.

Where the expressions "coarser" and "finer" are used in the accompanying claims it will be understood that "coarser" refers to undesired material, sometimes termed "tailings," and "finer" refers to desired material, and in the embodiment shown this material is classified to a desired degree of fineness.

Modifications may be made in the arrangement and location of parts within the spirit and scope of our invention, and such modifications are intended to be covered by the appended claims.

We claim:

1. Material handling apparatus comprising a casing, a bottom therein, a removable cover therefor, a rotating shaft mounted therein, a disc fastened on said shaft and of less diameter than the casing providing a narrow throat therearound, a removable cylinder of less height and diameter than said casing and mounted on said disc so as to rotate therewith, means for rotating the shaft so that said cylinder will set up and maintain a vortex of air suspended material in the space therearound, air inlet openings in said disc communicating with the interior of said cylinder and with the space below the disc, an opening into said cylinder at the top thereof, a trough, an opening in the casing above said cylinder and communicating with said trough, means for feeding material to be classified and air through said throat and into the space between the cylinder and casing, the coarser portion of said material passing off through said casing opening, and the finer portion of said material entering into and being collected on the interior of said cylinder.

2. Material handling apparatus comprising a casing, a bottom therein, a removable cover therefor, a rotating shaft mounted therein, a disc fastened on said shaft and of less diameter than the casing providing a narrow throat therearound, a removable cylinder of less height and diameter than said casing and mounted on said disc so as to rotate therewith, means for rotating the shaft so that said cylinder will set up and maintain a vortex of air suspended material in the space therearound, air inlet openings in said disc communicating with the interior of said cylinder and with the space below the disc, means for regulating the size of said inlet openings, an opening into said cylinder at the top thereof, a trough, an opening in the casing above said cylinder and communicating with said trough, means for feeding material to be classified and air through said throat and into the space between the cylinder and casing, the coarser portion of said material passing off through said casing opening, and the finer portion of said material entering into and being collected on the interior of said cylinder.

3. Material handling apparatus comprising a casing, a bottom therein, a removable cover therefor, a rotating shaft mounted therein, a disc fastened on said shaft and of less diameter than the casing providing a narrow throat therearound, a removable cylinder of less height and diameter than said casing and mounted on said disc so as to rotate therewith, means for rotating the shaft so that said cylinder will set up and maintain a vortex of air suspended material in the space therearound, air inlet openings in said disc communicating with the interior of said cylinder and with the space below the disc, a plate having openings therein registering with said air inlet openings and adjustable on said disc to govern said inlet openings, an opening into said cylinder at the top thereof, a trough, an opening in the casing above said cylinder and communicating with said trough, means for feeding material to be classified and air through said throat and into the space between the cylinder and casing, the coarser portion of said material passing off through said casing opening, and the finer portion of said material entering into and being collected on the interior of said cylinder.

4. Material handling apparatus comprising a casing, a bottom therein, a removable cover therefor, a rotating shaft mounted therein, a disc fastened on said shaft and of less diameter than the casing providing a narrow throat therearound, a removable cylinder of less height and diameter than said casing and mounted on said disc so as to rotate therewith, means for rotating the shaft so that said cylinder will set up and maintain a vortex of air suspended material in the space therearound, air inlet openings in said disc communicating with the interior of said cylinder and with the space below the disc, an opening into said cylinder at the top thereof, a trough mounted upon and surrounding the casing at the top thereof beneath said cover, the trough extending above the same leaving an opening thereinto, means for feeding material to be classified and air through said throat and into the space between the cylinder and casing.

5. Material handling apparatus comprising a casing, a bottom therein, a removable cover therefor, a rotating shaft mounted therein, a disc fastened on said shaft and of less diameter than the casing providing a narrow throat therearound, a removable cylinder of less height and diameter than said casing and mounted on said disc so as to rotate therewith, means for rotating the shaft so that said cylinder will set up and maintain a vortex of air suspended material in the space therearound, air inlet openings in said disc communicating with the interior of said cylinder, an opening into said cylinder at the top thereof, a trough, an opening in the casing above said cylinder and communicating with said trough, and bladed means beneath said disc for feeding material to be classified through said throat, the air inlets also opening into said bladed means.

6. Material handling apparatus comprising a casing, a bottom therein, a removable cover therefor, a rotating shaft mounted therein, a disc fastened on said shaft and of less diameter than the casing providing a narrow throat therearound, a removable cylinder of less height and diameter than said casing and mounted on said disc so as to rotate therewith, means for rotating the shaft so that said cylinder will set up and maintain a vortex of air suspended material in the space therearound, air inlet openings in said disc communicating with the interior of said cylinder and with the space below the disc, an opening into said cylinder at the top thereof, a trough, an opening in the casing above said cylinder and communicating with said trough, radial blades on the underside of said disc, a bladed distributor beneath said radial blades, and means for feeding material to be classified to said distributor.

7. Material handling apparatus comprising a closed casing, a rotating shaft mounted therein, a hollow cylinder of less height and diameter than said casing and mounted on said shaft so as to rotate therewith, means for rotating the shaft so that said cylinder will set up and maintain a vortex of air suspended material in the space therearound, an opening into said cylinder at the top thereof, a trough outside said casing, an opening in the casing communicating with said trough, means for feeding material to be classified to the space outside said cylinder, the coarser portion of said material being eliminated through said casing opening, and means for causing the finer portion of said material to enter said cylinder through said opening and to collect in said cylinder.

8. Material handling apparatus comprising a closed casing, a rotating shaft mounted therein, a cylinder of less height and diameter than said casing and mounted on said shaft, the cylinder setting up a vortex action inside and outside thereof, an opening into said cylinder at the top thereof, a trough, an opening in the casing above said cylinder and communicating with said trough, means for feeding material to be classified to the space between the cylinder and casing, the material being suspended in the vortex in said space, the coarser portion of said material passing off through said casing opening, and means for causing the finer portion of said material to enter said cylinder and to collect therein.

9. Material handling apparatus comprising a closed casing, a rotating shaft mounted therein, a cylinder of less height and diameter than said casing and mounted on said shaft, the cylinder setting up a vortex action inside and outside thereof, an opening into said cylinder at the top thereof, a trough, an opening in the casing above said cylinder and communicating with said trough, means for feeding material to be classified to the space between the cylinder and casing, the material being suspended in the vortex in said space, the coarser portion of said material passing off through said casing opening, and means for causing the finer portion of said material to be collected on the interior of said cylinder.

10. Material handling apparatus comprising a closed casing, a rotating shaft mounted therein, a cylinder of less height and diameter than said casing and mounted on said shaft, the cylinder setting up a vortex action inside and outside thereof, an opening into said cylinder at the top thereof, a trough, an opening in the casing above said cylinder and communicating with said trough, means for feeding material to be classified to the space between the cylinder and casing, the material being suspended in the vortex in said space, means for disintegrating material as it is being fed into said space, the coarser portion of said material passing off through said casing opening, and means for causing the finer portion of said material to enter said cylinder and to collect therein.

11. Material handling apparatus comprising a closed casing, a rotating shaft therein, an open ended cylinder mounted on said shaft so as to rotate therewith, the cylinder being of less height than the casing and having a diameter from two to six inches less than said casing, the cylinder rotating at such speed as to set up and maintain a vortex of air and suspended material in said casing, a trough, an opening in said casing adjacent the level of the upper end of the cylinder and communicating with said trough, means for feeding material to be classified to the space between the casing and cylinder, the coarser material passing into said trough through said opening, and means for causing the finer material to enter said cylinder and collect therein.

HENRY G. LYKKEN.
WILLIAM H. LYKKEN.

REFERENCES CITED

The following references are of record in the file of this patent:

UNITED STATES PATENTS

| Number | Name | Date |
| --- | --- | --- |
| 1,457,110 | Gay | May 29, 1923 |
| 1,996,076 | Lissman | Apr. 2, 1935 |
| 2,068,599 | Ehrsam | Jan. 19, 1937 |
| 2,092,307 | Gaffney | Sept. 7, 1937 |
| 2,125,086 | Rourke | July 26, 1938 |
| 2,050,231 | Sackett | Aug. 4, 1936 |
| 2,258,901 | Lykken | Oct. 14, 1941 |
| 2,269,716 | Gregg | Jan. 13, 1942 |
| 2,274,521 | Berry | Feb. 24, 1942 |
| 2,294,920 | Lykken | Sept. 8, 1942 |
| 2,359,911 | Grindle | Oct. 10, 1944 |

OTHER REFERENCES

Gayco Centrifugal Air Separator Bulletin published by the Rupert M. Gay Company, 114 Liberty Street, New York, New York, received in Patent Office July 1, 1932.